United States Patent [19]
Isbell

[11] 4,437,523
[45] Mar. 20, 1984

[54] LAWN EDGING DEVICE

[76] Inventor: Joe A. Isbell, 837 Argus, Milan, Tenn. 38358

[21] Appl. No.: 363,653

[22] Filed: Mar. 30, 1982

[51] Int. Cl.³ .............................................. A01B 1/24
[52] U.S. Cl. .................................. 172/13; 30/DIG. 5; 30/315
[58] Field of Search .................. 172/13, 14, 15, 16, 172/17, 18, 380; 30/314, 315, 316, 317, 318, DIG. 5

[56] References Cited

U.S. PATENT DOCUMENTS

| | | | |
|---|---|---|---|
| 1,821,829 | 9/1931 | Coe | 172/536 |
| 2,015,109 | 9/1935 | Hays | 172/18 |
| 2,503,757 | 4/1950 | Morgan | 172/18 |
| 2,568,468 | 9/1951 | Smith | 172/16 |
| 2,624,938 | 1/1953 | Davis | 172/13 X |
| 2,949,670 | 8/1960 | Birchfield | 172/13 |
| 3,058,530 | 10/1962 | Keinath | 172/13 |
| 3,474,535 | 10/1969 | Kramer | 30/315 |
| 3,474,868 | 10/1969 | Watson | 172/13 |
| 4,200,155 | 4/1980 | Mullet | 172/14 |

FOREIGN PATENT DOCUMENTS 230753 10/1959 Australia ............................ 30/315

Primary Examiner—Richard J. Johnson
Attorney, Agent, or Firm—Walker & McKenzie

[57] ABSTRACT

A device for edging lawns around concrete walkways, driveways, etc. The device includes a handle and a blade for being forced between the lawn and the walkway. The blade is specially formed so that the cutting edge thereof will be forced against the walkway as it is forced downward and rotated through the lawn whereby the device is self-sharpening as it is used.

1 Claim, 9 Drawing Figures

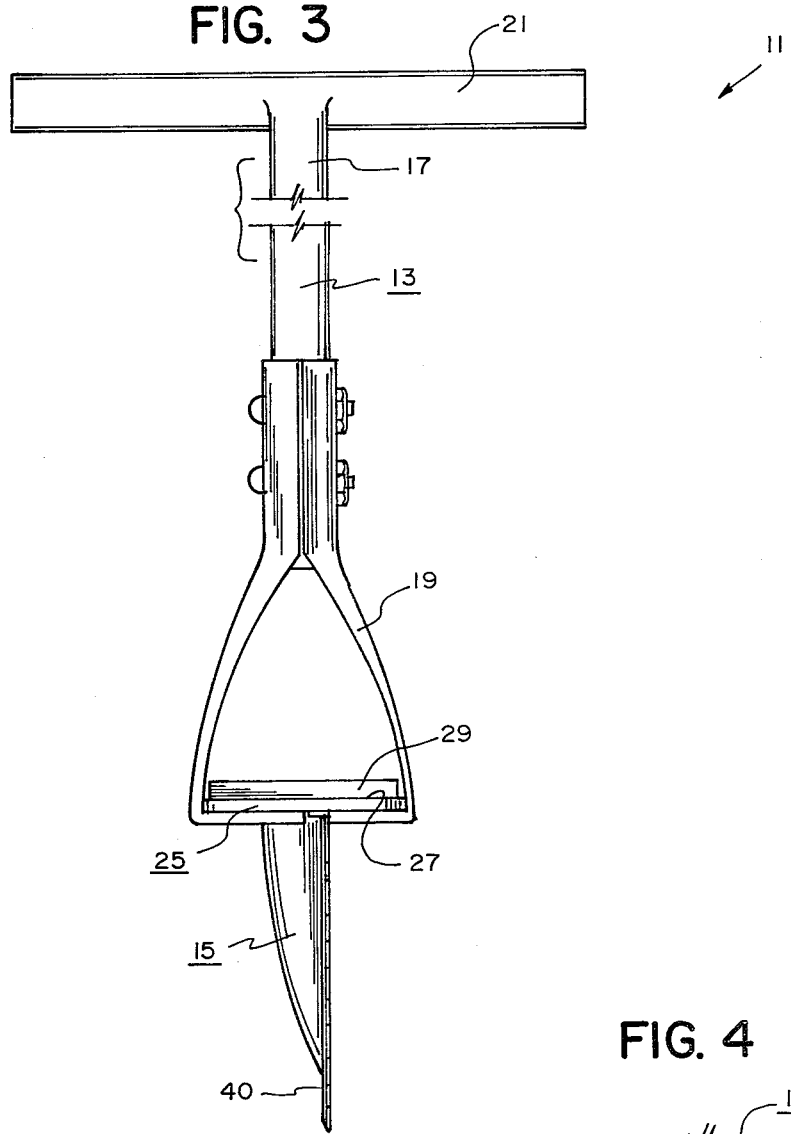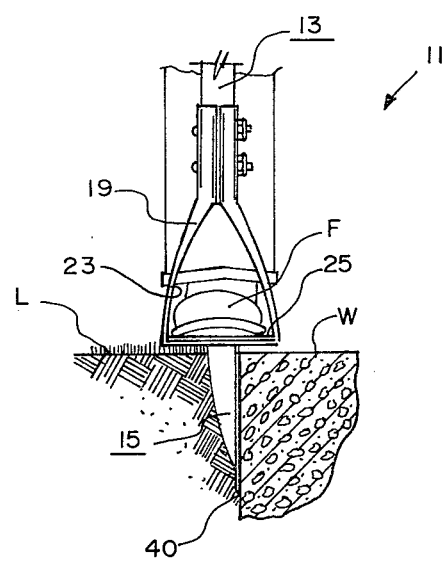

LAWN EDGING DEVICE

BACKGROUND OF THE INVENTION

1. Field of the Invention

The present invention relates to tools for use in trimming lawns around sidewalks, driveways, curbs, etc.

2. Description of the Prior Art

Perhaps the most common device now used to trim lawns around sidewalks and the like is the motorized edger having a generally vertical cutting blade and a gas or electric motor for rotating the cutting blade. While such devices are capable of trimming lawns around sidewalks and the like, they are relatively expensive and do consume energy resources (gas or electricity) and require somewhat frequent replacement or resharpening of the cutting blades thereof, etc. Various manual devices or methods have been used to trim lawns around sidewalks and the like. See, for example, Hays, U.S. Pat. No. 2,015,109; Morgan, U.S. Pat. No. 2,503,757; Davis, U.S. Pat. No. 2,624,938; Birchfield U.S. Pat. No. 2,949,670; Kramer, U.S. Pat. No. 3,474,535; and Watson, U.S. Pat. No. 3,474,868. None of the above patents disclose or suggest the present invention. Such manual devices have not proved completely satisfactory because of the difficulty of trimming the lawns with such devices and the difficulty of maintaining the blades of such devices sharp, etc.

SUMMARY OF THE INVENTION

The present invention is directed towards providing an easy to use, efficient manual device for trimming or edging lawns and the like around sidewalks, driveways, curbs, etc. The concept of the present invention is to provide a manual device for edging lawns around concrete walkways or the like with means for forcing the cutting edge of the blade thereof against the concrete walkway or the like as it is forced downward and rotated forward through a lawn adjacent the concrete walkway whereby the cutting edge is maintained sharp and the lawn is properly edged against the walkway. The device of the present invention includes, in general, a handle member and a blade member attached to the handle member, the blade member includes a cutting edge for being forced downward and rotated forward through the lawn adjacent a concrete walkway or the like and includes means for causing the cutting edge to be forced against the concrete walkway as the blade member is forced downward and rotated forward through the lawn adjacent the concrete walkway.

BRIEF DESCRIPTION OF THE DRAWINGS

FIG. 3 is a front elevational view thereof.

FIG. 4 is a reduced front elevational view thereof showing the device in use.

DESCRIPTION OF THE PREFERRED EMBODIMENTS

The device of the present invention is for edging lawns L (the term "lawn" is used here to define any section of grass-covered ground or the like) around concrete walkways W (the term "concrete walkways" is used here to define any of the various physical features adjacent a lawn that it is desired to trim or edge the lawn thereabout such as brick or concrete sidewalks, driveways, curbs, roadways, etc.).

A first embodiment of the device of the present invention is shown in FIGS. 1-6 and is identified by the numeral 11. The device 11 includes, in general, a handle member 13 and a blade member 15 attached to the handle member 13 for being forced downward and rotated forward through the lawn L adjacent the concrete walkway W to thereby cut, trim or edge the lawn L adjacent the concrete walkway W.

Figure 1:
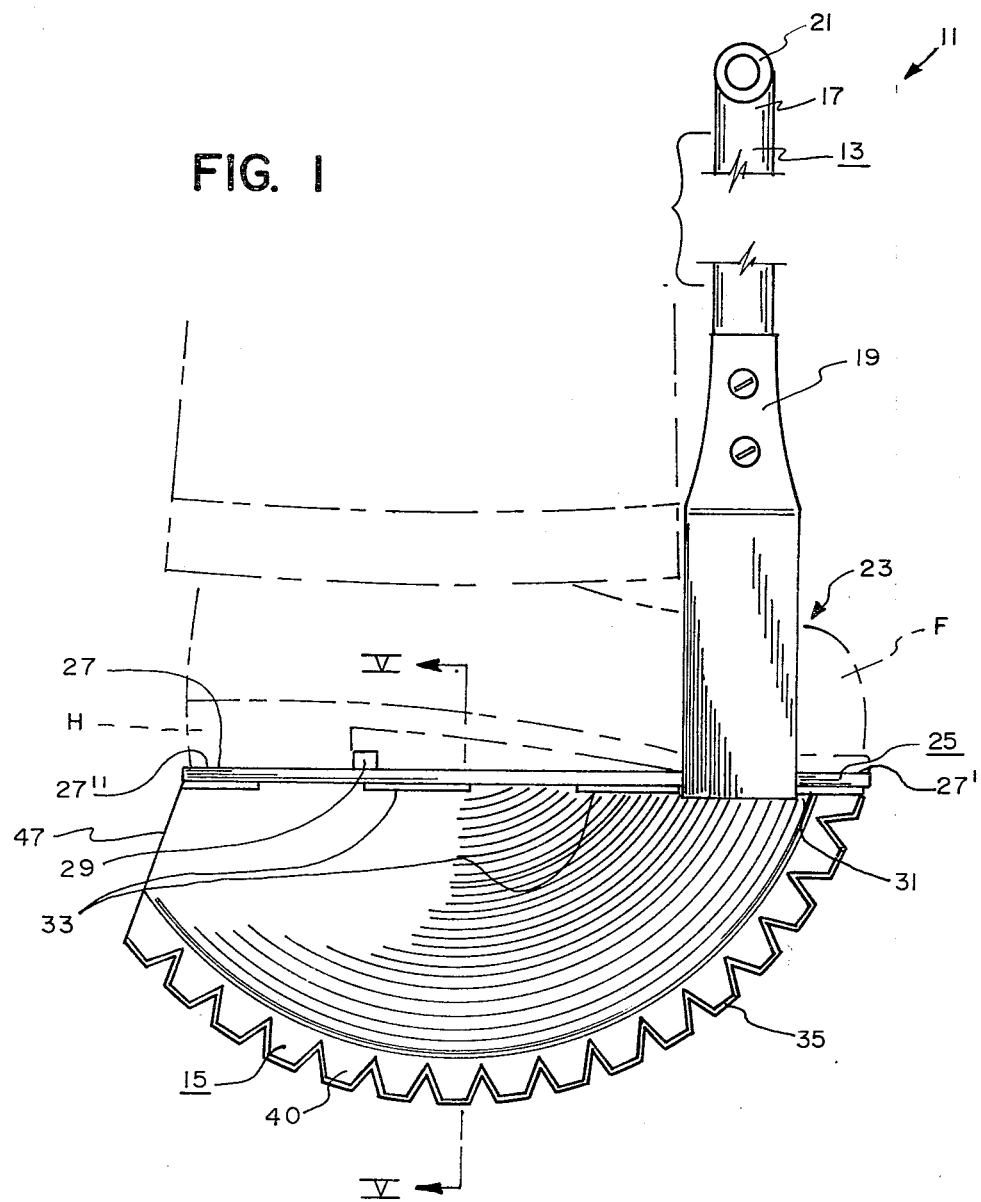
FIG. 1 is a side elevational view of a first embodiment of the lawn edging device of the present invention with portions thereof broken away and with portions of the user thereof shown in broken lines.
Figure 2:
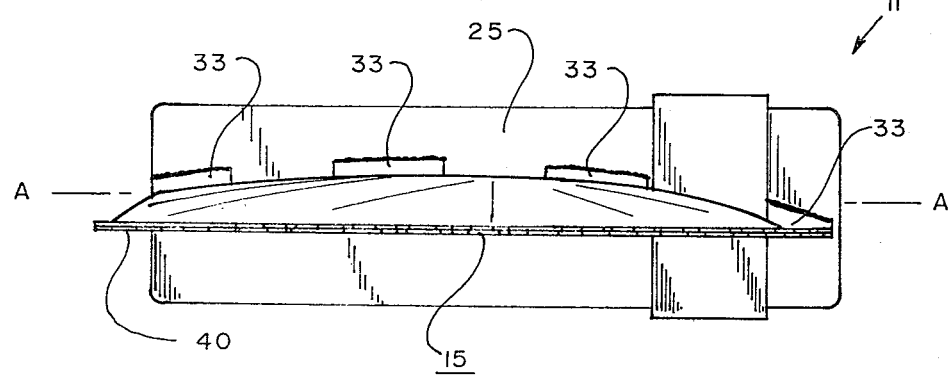
FIG. 2 is a bottom plan view thereof.

The handle member 13 is preferably elongated, having a first end 17 and a second end 19. The first end 17 of the handle member 13 preferably includes a grip portion 21 for allowing the operator of the device 11 to securely grip the handle member 13. The grip portion 21 and the first end 17 may be of various configurations. For example, the grip portion 21 may consist of a transverse bar member fixedly attached to the first end 17 of the handle member 13 for providing a tee-shaped "two hand grip" for the handle member 13 (see FIG. 3) or may be constructed from one or more pieces of material bent and shaped for operating said device with one hand instead of two (not shown). The second end 19 of the handle member 13 preferably has an aperture 23 therethrough for allowing the operator of the device 11 to extend a portion of his foot F therethrough as shown in FIGS. 1 and 4. The specific construction of the handle member 13 may vary in any manner which may now be apparent to those skilled in the art. For example, the handle member 13 may be constructed of metal, formed and welded into the general configuration shown in the drawing.

The device 11 preferably includes an anvil means 25 attached to the second end 19 of the handle member 13 for receiving the foot F of the operator of the device 11. The anvil means 25 preferably includes a generally flat upper surface 27 having a forward end 27' and a rearward end 27", and shaped so as to receive substantially the entire bottom of the foot F of the operator of the device 11. The anvil means 25 has a longitudinal axis indicated generally by the line A—A in FIG. 2. The blade member 15 is preferably fixedly attached to the anvil means 25 substantially in line with the longitudinal axis A—A of the upper surface 27 of the anvil means 25. The anvil means 25 preferably has a raised, transverse member 29 fixedly attached to the upper surface 27 thereof for engaging the heel H of the foot F of the operator of the device 11 to act as a stop as clearly shown in FIG. 1. The anvil means 25 may be fixedly attached to the second end 19 of the handle member 13 in any manner now apparent to those skilled in the art.

For example, the anvil means 25 may pass through the aperture 23 in the second end 19 of the handle member 13 and be welded thereto. Preferably, the second end 19 of the handle member 13 is attached to the anvil means 25 substantially adjacent the forward end 27' thereof as clearly shown in FIG. 1 for reasons which will hereinafter become apparent. The anvil means 25 may be constructed of any substantially rigid material such as metal in any manner apparent to those skilled in the art.

The blade member 15 preferably has an upper edge 31 for being attached to the anvil means 25 substantially in line with the longitudinal axis A—A of the anvil means 25. The upper edge 31 of the blade member 15 may be attached to the anvil means 25 in any manner now apparent to those skilled in the art. For example, the upper edge 31 of the blade member 15 may be provided with tab members 33 for being welded to the anvil means 25 to securely and fixedly attach the blade member 15 to the anvil means 25 (see, in general, FIGS. 1, 2 and 5). The blade member 15 preferably has a first side 37 for being directed toward the concrete walkway W as the blade member 15 is forced downward and rotated forward through the lawn L adjacent the concrete walkway W, and preferably has a second side 39 for being directed against the lawn L as the blade member 15 is forced downward and rotated forward through the lawn L adjacent the concrete walkway W (see, in general, FIG. 5). The first side 37 of the blade member 15 is preferably concave and the second side 39 of the blade member 15 is preferably convex as clearly shown in the drawings (see, in general, FIG. 5). The blade member 15 preferably has a flat, straight (i.e., not concave or convex) rim portion 40 extending about the curved lower edge thereof for contacting the concrete walkway W as the blade member 15 is forced downward and rotated forward through the lawn L adjacent the concrete walkway W (see, in general, FIGS. 5 and 6). The blade member 15 preferably includes a cutting edge 41 provided on the lower edge thereof for allowing the blade member 15 to easily cut through the lawn L as the blade member 15 is forced downward and rotated forward through the lawn L (see, in general, FIG. 5). The cutting edge 41 is preferably formed by grinding the lower edge of the rim portion 40 at a relatively sharp angle as at 42 in FIG. 5 from the second side 39 of the blade member 15 or by any other method that would be familiar to those skilled in the art. The convexed second side 39 of the blade member 15 causes the rim portion 40 and the cutting edge 41 of the blade member 15 to be urged against the concrete walkway W as the blade member 15 is forced downward and rotated forward through the lawn L adjacent the concrete walkway W. More specifically, as the blade member 15 is forced downward in the direction of the arrow 43 (see FIG. 5) and rotated forward, the convexed second side 39 of the blade member 15 will act similar to a wedge to coact with the lawn L to force one side of the rim portion 40 and the cutting edge 41 of the blade member 15 against the concrete walkway W in the direction of the arrow 45 (see FIG. 5). The rim portion 40 of the blade member 15 is preferably serrated and has a substantially vertical rear end 47 as clearly shown in FIG. 1 for making it easier to force the blade member 15 downwardly and to be rotated forward through the lawn L. The serrations on the rim portion 40 of the blade member 15 preferably do not extend into the concave-convex portions of the blade member 15. Thus, for example, the rim portion 40 may have a general depth of ¾ inch (1.9 centimeters) as indicated by the dimension "a" on FIG. 5 while the depth of the serrations may be ½ inch (1.3 centimeters) as indicated by the dimension "b" on FIG. 5. The blade member 15 is preferably constructed of a metal in any manner apparent to a person skilled in the art. For example, the blade member 15 may be constructed in much the same manner as a typical harrow disk or the like.

Figure 5:
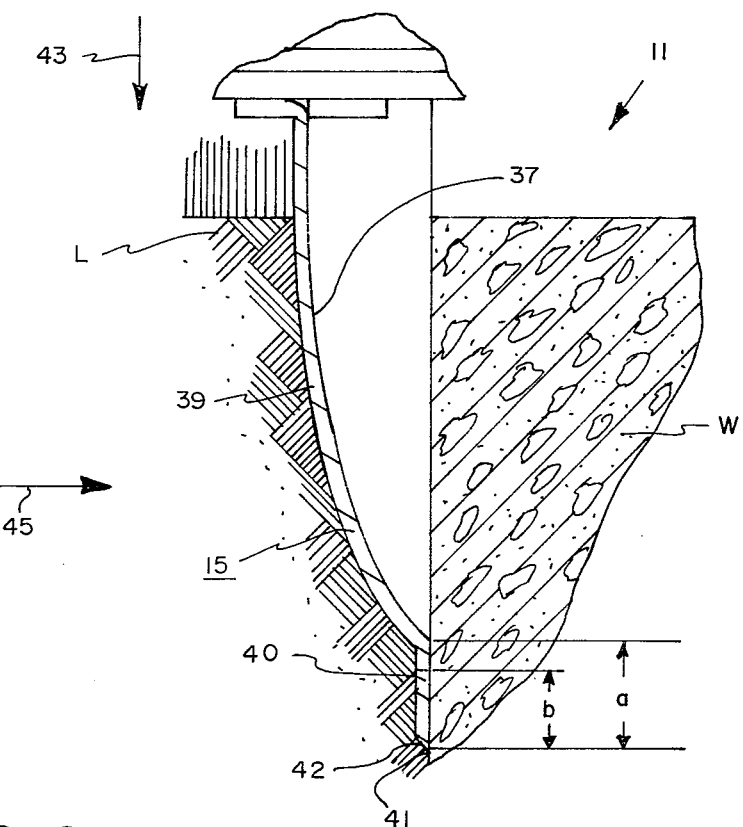
FIG. 5 is an enlarged sectional view as taken on line V—V of FIG. 1 with a portion of the lawn and concrete walkway shown in conjunction therewith.
Figure 6:
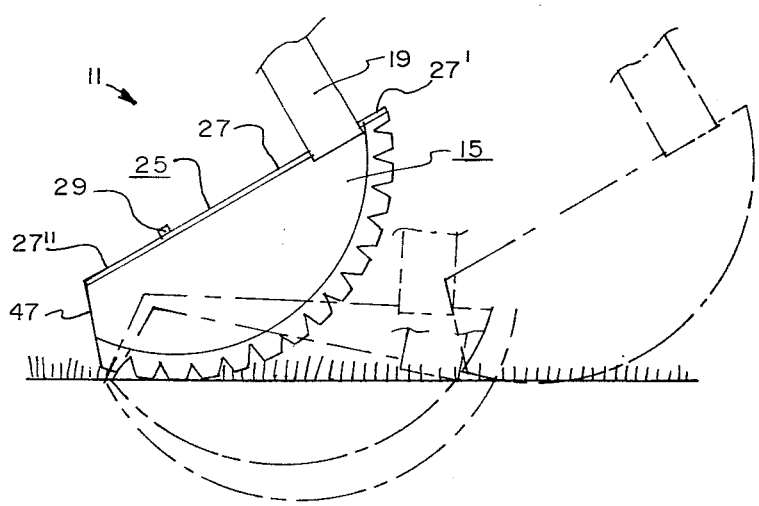
FIG. 6 is a somewhat diagrammatic reduced side elevational view thereof showing the rocking and rotating forward, in-use motion thereof.

The operation of the device 11 is quite simple. The first step in trimming or edging a lawn L with the device 11 is to place the rear end 47 of the lower edge 35 of the blade member 15 on the lawn L with the concave side 37 adjacent the concrete walkway W to be edged. Next, the operator of the device 11 inserts the toe of his foot F through the aperture 23 in the second end 19 of the handle 13 and rests the bottom of his foot F on the upper surface 27 of the anvil means 25 with the heel H of his foot engaging the raised, transverse member 29 on the upper surface 27 of the anvil means 25, and simultaneously grips the grip portion 21 of the anvil member 13 with both hands. The operator then simultaneously pushes the handle member 13 forward with the grip portion 21 and forces anvil means 25 downward to cause a forward rotating scissors action of the device 11 whereby the blade member 15 will be easily driven forward and downward through the lawn L adjacent the concrete walkway W as diagrammatically shown in FIG. 6. As the blade member 15 is driven forward and downward, the rim portion 40 and the cutting edge 41 thereof will rub against the concrete walkway W as indicated in FIG. 5 because of the wedgelike action between the convexed second side 39 of the blade member 15 and the lawn L and because of the concaved first side 37 of the blade member 15 whereby the lawn L will be properly edged in a slicing scissors action close to the concrete walkway W while the cutting edge 41 is being constantly sharpened. In general the device 11 becomes one half of a pair of scissors, with the walkway W to be edged becoming the other half of the scissors and is operated in much the same manner.

Figure 7:
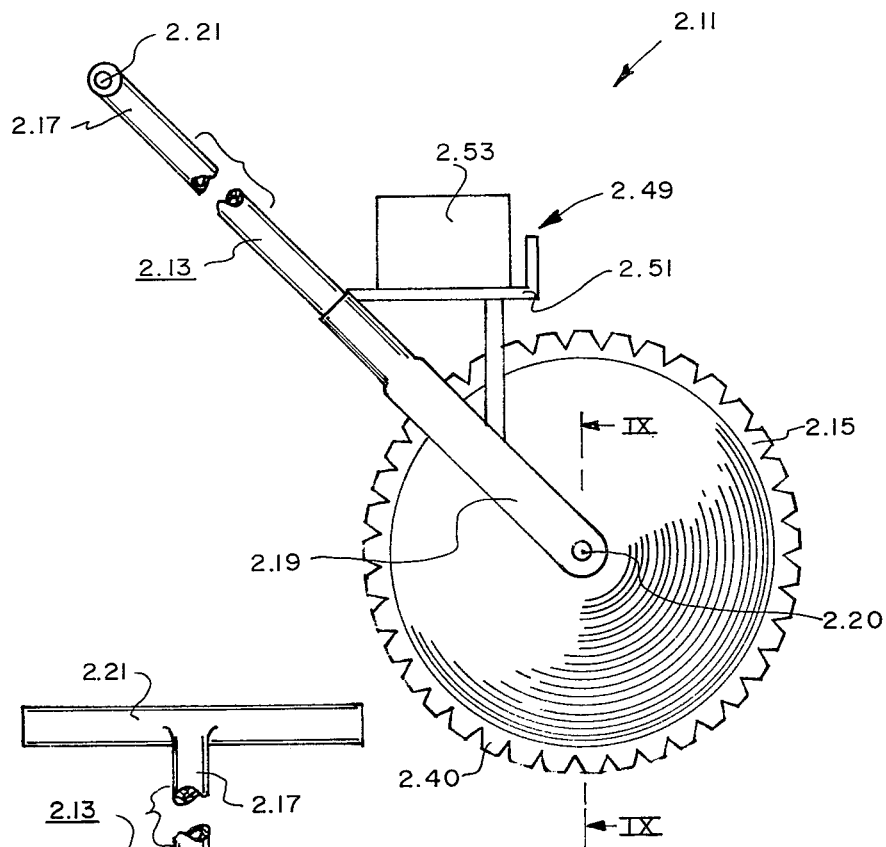
FIG. 7 is a side elevational view of a second embodiment of the lawn edging device of the present invention with portions thereof broken away.
Figure 8:
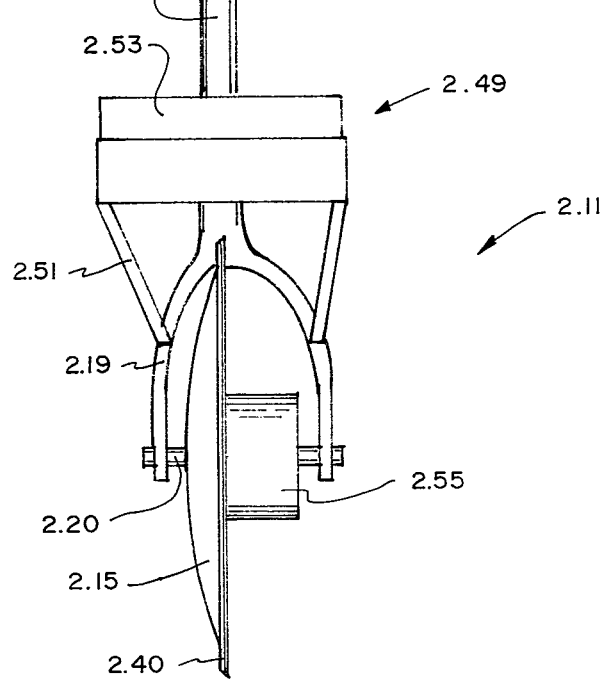
FIG. 8 is a front elevational view of a portion thereof.
Figure 9:
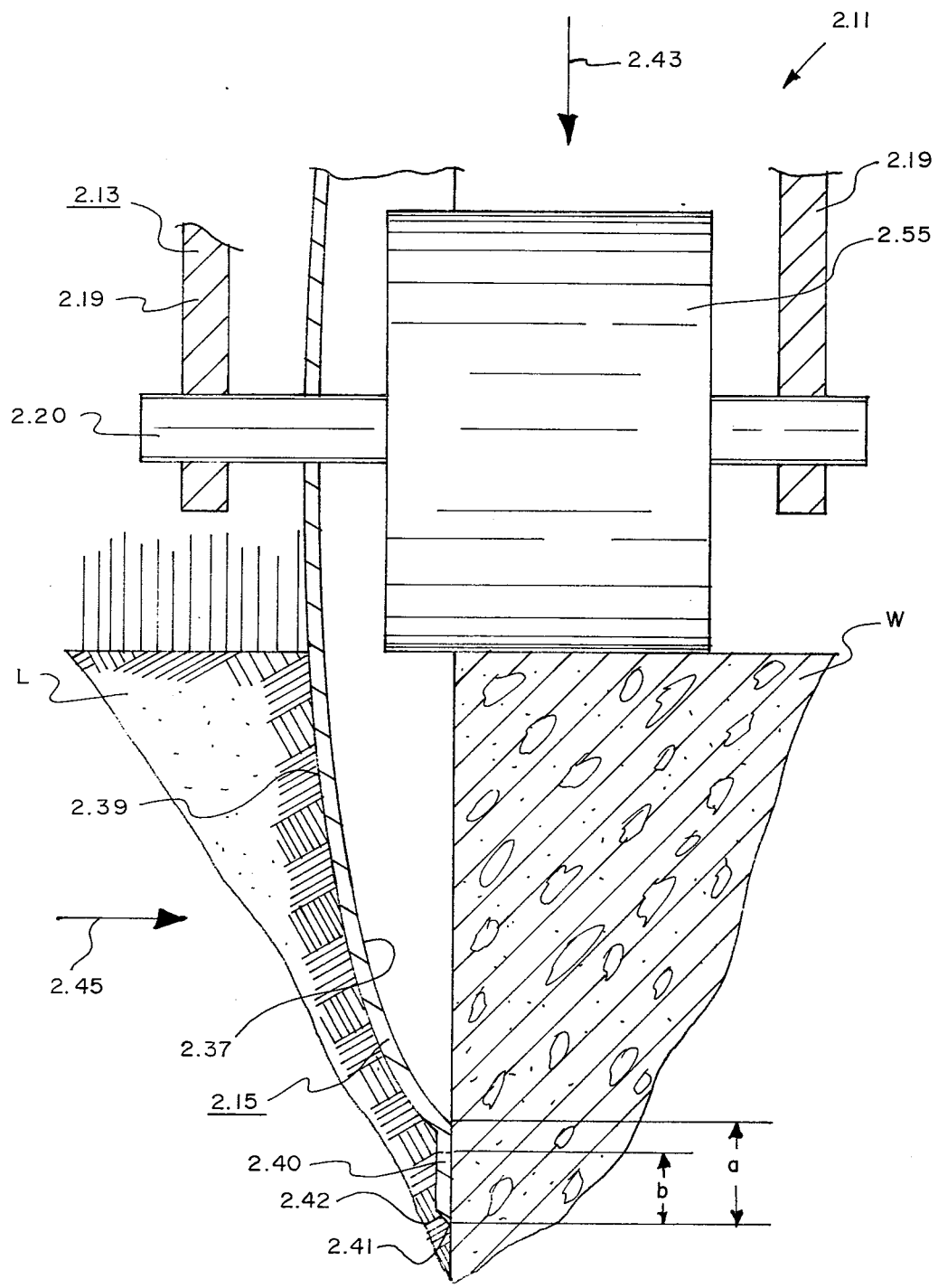
FIG. 9 is an enlarged sectional view substantially as taken on line IX—IX of FIG. 7 with a portion of the lawn and concrete walkway shown in conjunction therewith.

A second embodiment of the device of the present invention is shown in FIGS. 7–9 and is identified by the numeral 2.11. The device 2.11 includes, in general, a handle member 2.13 for being forced downward and rotated forward through the lawn L adjacent the concrete walkway W to thereby cut, trim or edge the lawn L adjacent the concrete walkway W.

The handle member 2.13 is preferably elongated, having a first end 2.17 and a second end 2.19 (see, in general, FIGS. 7 and 8). The first end 2.17 of the handle member 2.13 preferably includes a grip portion 2.21 for allowing the operator of the device 2.11 to securely grip the handle member 2.13. The grip portion 2.21 and the first end 2.17 may be of various configurations. For example, the grip portion 2.21 may consist of a transverse bar member fixedly attached to the first end 2.17 of the handle member 2.13 for providing a tee-shaped "two hand grip" for the handle member 2.13 as shown in FIG. 8 or may be constructed from one or more pieces of material bent and shaped for operating said device with one hand instead of two (not shown). The second end 2.19 of the handle member 2.13 is preferably bifurcated for receiving the blade member 2.15 in a manner which will be hereinafter explained. The specific construction of the handle member 2.13 may vary in any manner which may now be apparent to those skilled in the art. For example, the handle member 2.13 may be constructed of metal, formed and welded into the general configuration shown in the drawing.

The blade member 2.15 is preferably circular in shape when viewed from the side (see FIG. 7) and closely resembles a typical harrow disk or the like. The blade member 2.15 is preferably rotatably attached to the second end 2.19 of the handle member 2.13. For example, an axle 2.20 may extend between and be fixedly attached to the bifurcated portions of the second end 2.19 of the handle member 2.13 and may be rotatably fixed to the blade member 2.15 by way of a bushing or the like (not shown).

The blade member 2.15 preferably has a first side 2.37 for being directed toward the concrete walkway W as the blade member 2.15 is forced downward and rotated through the lawn L adjacent the concrete walkway W, and preferably has a second side 2.39 for being directed against the lawn L as the blade member 2.15 is forced downward and rotated through the lawn L adjacent the concrete walkway W (see, in general, FIG. 9). The first side 2.37 of the blade member 2.15 is preferably concave and the second side 2.39 of the blade member 2.15 is preferably convex as clearly shown in the drawings (see, in general, FIG. 9). The blade member 2.15 preferably has a flat, straight (i.e., not concave or convex) rim portion 2.40 extending about the outer edge thereof for contacting the concrete walkway W as the blade member 2.15 is forced downward and rotated through the lawn L adjacent the concrete walkway W (see, in general, FIG. 9). The blade member 2.15 preferably includes a cutting edge 2.41 provided on the outer edge thereof for allowing the blade member 2.15 to easily cut through the lawn L as the blade member 2.15 is forced downward and rotated through the lawn L. The cutting edge 2.41 is preferably formed by grinding the outer edge of the rim portion 2.40 at a relatively sharp angle as at 2.42 in FIG. 9 from the second side 2.39 of the blade member 2.15 or by any other method that would be familiar to those skilled in the art. The convexed second side 2.39 of the blade member 2.15 causes the rim portion 2.40 and the cutting edge 2.41 of the blade member 2.15 to be urged against the concrete walkway W as the blade member 2.15 is forced downward and rotated through the lawn L adjacent the concrete walkway W. More specifically, as the blade member 2.15 is forced downward in the direction of the arrow 2.43 (see FIG. 9) and rotated, the convexed second side 2.39 of the blade member 2.15 will act similar to a wedge to coact with the lawn L for forcing one side of the rim portion 2.40 and the cutting edge 2.41 of the blade member 2.15 against the concrete walkway W in the direction of the arrow 2.45 (see FIG. 9). The rim portion 2.40 of the blade member 2.15 is preferably serrated as clearly shown in FIG. 7 for making it easier to force the blade member 2.15 downwardly and to be rotated through the lawn L. The serrations on the rim portion 2.38 of the blade member 2.15 preferably do not extend into the concave-convex portions of the blade member 2.15. Thus, for example, the rim portion 2.40 may have a general depth of ¾ inch (1.9 centimeters) as indicated by the dimension "a" on FIG. 9 while the depth of the serrations may be ½ inch (1.3 centimeters) as indicated by the dimension "b" on FIG. 9. The blade member 2.15 is preferably constructed of a metal in any manner apparent to a person skilled in the art. For example, the blade member 2.15 may be constructed in much the same manner as a typical harrow disk or the like.

The device 2.11 is preferably provided with a weight means 2.49 to aid in forcing the blade member 2.15 downward in the direction of the arrow 2.43 in FIG. 9. The weight means 2.49 may include a platform member 2.51 fixedly attached to the handle member 2.13 at a location that will be essentially above a portion of the blade member 2.15 when the device 2.11 is held in an in-use position as shown in FIG. 7. The platform member 2.51 is adapted to support a weight 2.53 such as a concrete block or the like for causing a downward force to be applied to the blade member 2.15 as the device 2.11 is pushed or rolled along the concrete walkway W.

The device 2.11 may be provided with a depth-gauge means such as a roller 2.55 attached to the blade member 2.15 or axle 2.20 for acting as a depth gauge to prevent the blade member 2.15 from going too deep into the lawn L beside the concrete walkway W (see, FIG. 9). The roller 2.55 is mounted on the first side 2.37 of the blade member 2.15 for engaging and rolling upon the concrete walkway W as shown in FIG. 9 when the device 2.11 is being used. The device 2.11 can be constructed and used without the roller 2.55.

The operation of the device 2.11 is quite simple. The first step in trimming or edging a lawn L with the device 2.11 is to place the blade member 2.15 on the lawn L with the concave side 2.37 adjacent the concrete walkway W to be edged and place the weight 2.53 on the platform member 2.51. The operator then pushes or pulls the handle member 2.13 forward or backward with the grip portion 2.21 while the weight 2.53 forces the blade member 2.15 downward to cause a forward or backward rotating scissor action of the device 2.11 whereby the blade member 2.15 will be easily driven forward or backward and downward through the lawn L adjacent the concrete walkway W as diagrammatically shown in FIG. 9. As the blade member 2.15 is driven forward or backward and downward, the rim portion 2.40 and the cutting edge 2.41 thereof will rub against the concrete walkway W as indicated in FIG. 9 because of the wedgelike action between the convexed second side 2.39 of the blade member 2.15 and the lawn L and because of the concaved first side 2.37 of the blade member 2.15 whereby the lawn L will be properly edged in a slicing scissors action close to the concrete walkway W while the cutting edge 41 is being constantly sharpened. In general, the device 2.11 becomes one half of a pair of scissors, with the walkway W to be edged becoming the other half of the scissors and is operated in much the same manner.

Although the present invention has been described and illustrated with respect to preferred embodiments thereof and preferred uses therefor, it is not to be so limited since changes and modifications can be made therein which are within the full intended scope of the invention.

I claim:

1. A device for edging lawns around concrete walkways, said device comprising:
   (a) An elongated handle member having a first end and a second end, said first end including a grip portion for allowing the operator of said device to securely grip said handle member, said second end having an aperture therethrough for allowing the operator of said device to extend his foot therethrough;
   (b) an anvil means attached to said second end of said handle member for receiving the foot of the operator of said device, said anvil means including a generally flat upper surface having a forward end and a rearward end and shaped so as to receive the entire bottom of the foot of the operator of said device, said upper surface of said anvil means having a longitudinal axis, said anvil means having a raised, transverse member attached to said upper surface substantially adjacent the rearward end thereof for engaging the heel of the foot of the operator of said device; and (c) a blade member having an upper edge for being attached to said anvil means substantially in line with said longitudinal axis of said upper surface of said anvil means and having a curved lower edge for being forced downward and rotated forward through the lawn adjacent the concrete walkway, said blade member having a first side for being directed toward the concrete walkway as said lower edge is forced downward and rotated forward through the lawn and having a second side for being directed against the lawn as said lower edge is forced downward and rotated forward through the lawn, said blade member including a cutting edge on said first side adjacent said lower edge for cutting through the lawn as said blade member is forced downward and rotated forward through the lawn, said first side of said blade member being concaved and said second side of said blade member being convexed for causing said cutting edge of said blade member to be urged against the concrete walkway as said blade member is forced downward and rotated forward through the lawn, thus causing a slicing scirrors action, said lower edge of said blade member being serrated.

* * * * *